United States Patent [19]

Hirose

[11] Patent Number: 4,993,673
[45] Date of Patent: Feb. 19, 1991

[54] MECHANISM FOR MOVING A TABLE IN ORTHOGONAL DIRECTIONS

[75] Inventor: Kazuya Hirose, Tokyo, Japan

[73] Assignee: Hihaisuto Seiko Kabushiki Kaisha, Tokyo, Japan

[21] Appl. No.: 326,032

[22] Filed: Mar. 20, 1989

[30] Foreign Application Priority Data

Mar. 22, 1988 [JP] Japan .................................. 63-67558

[51] Int. Cl.$^5$ ............................................. G05G 11/00
[52] U.S. Cl. .................................... 248/178; 248/913; 248/657; 108/143
[58] Field of Search ............... 248/913, 178, 179, 660, 248/657; 108/143, 137, 138; 299/58, 60, 61, 62, 66; 350/329, 330, 331

[56] References Cited

U.S. PATENT DOCUMENTS

| | | | |
|---|---|---|---|
| 3,010,363 | 11/1961 | Malfeld | 248/660 X |
| 3,270,423 | 9/1966 | Birrell et al. | 269/60 X |
| 3,849,857 | 11/1974 | Murray, Jr. | 248/913 X |
| 4,409,866 | 10/1983 | Moriyama et al. | 108/143 |

Primary Examiner—Alvin C. Chin-Shue
Attorney, Agent, or Firm—Wenderoth, Lind & Ponack

[57] ABSTRACT

A mechanism for moving a table means lengthwise and crosswise of the table has two mutually orthogonal pairs of table carried parallel guide faces adapted to be mounted on the table, a support base, two pairs of guide members having two mutually orthogonal pairs of parallel guide faces in spaced opposed relation to corresponding pairs of said table carried guide faces, the guide members being movably mounted on the support base for movement in a direction for moving parallel guide faces of the respective pairs in a direction perpendicular to the length of the guide faces, two pairs of parallel straight motion guide bearing mechanisms mounted between opposed pairs of guide faces for lengthwise movably supporting the table on the guide members, and a driving device engaged with at least one guide member of each pair of guide members for moving the one guide member in a direction to move the guide face thereof in the perpendicular direction. Alternatively, the table can be supported on a support bearing structure and guide bearings used between the guide faces.

6 Claims, 5 Drawing Sheets

MECHANISM FOR MOVING A TABLE IN ORTHOGONAL DIRECTIONS

FIELD OF THE INVENTION

The present invention relates to a mechanism for moving a table or the like in orthogonal directions, such as lengthwise and crosswise relative to the length and width, e.g. travelling table, for use in precision measuring instruments, precision machines, or working under a microscope in IC production or biotechnology, etc.

BACKGROUND OF THE INVENTION

In a conventional X-Y travelling table, a pair of monoaxial moving mechanisms, each of which is composed of a pair of straight motion guide bearings and one feed screw mechanism to provide movement in one direction, are mounted in combination with their moving directions kept orthogonal to cause a table to move lengthwise and crosswise.

Such a structure has various problems, such as that the height from the support base to the table is sufficiently great to make the mechanism relatively unstable and to cause it to occupy a large space, that the number of parts is large, that many man hours are required for assembling, that it is relatively difficult to assembly with accuracy, and so on.

OBJECT AND BRIEF SUMMARY OF THE INVENTION

The object of the present invention is to overcome these conventional problems. To this end, the mechanism of the present invention is composed of a mechanism for moving a table means in orthogonal directions, such as lengthwise and crosswise of the table which has two mutually orthogonal pairs of table carried parallel guide faces adapted to be mounted on the table, a support base, two pairs of guide members having two mutually orthogonal pairs of parallel guide faces in spaced opposed relation to corresponding pairs of the table carried guide faces, the guide members being movably mounted on the support base for movement in a direction for moving parallel guide faces of the respective pairs in a direction perpendicular to the length of the guide faces, two pairs of parallel straight motion guide bearing mechanisms mounted between opposed pairs of guide faces for lengthwise movably supporting the table on the guide members, and a driving device engaged with at least one guide member of each pair of guide members for moving the one guide member in a direction to move the guide face thereof in the perpendicular direction. Alternatively, the table can be supported on a support bearing structure and guide bearings used between the guide faces.

BRIEF DESCRIPTION OF THE DRAWINGS

The invention will now be described in greater detail in connection with the drawings, in which.

DETAILED DESCRIPTION OF THE INVENTION

Figure 1A:
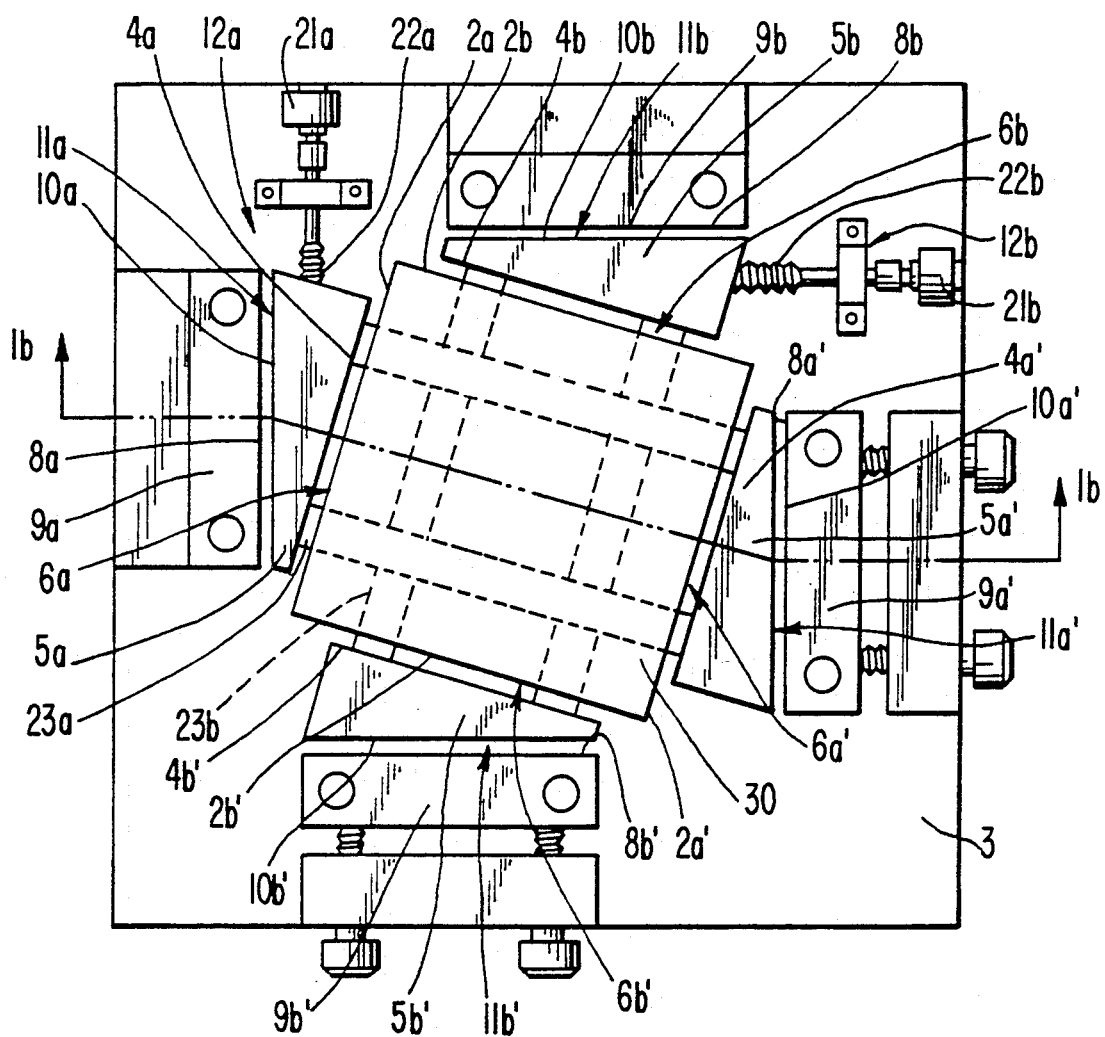
FIG. 1(a) is a plan view of a mechanism according to the invention with the table removed.
Figure 1B:
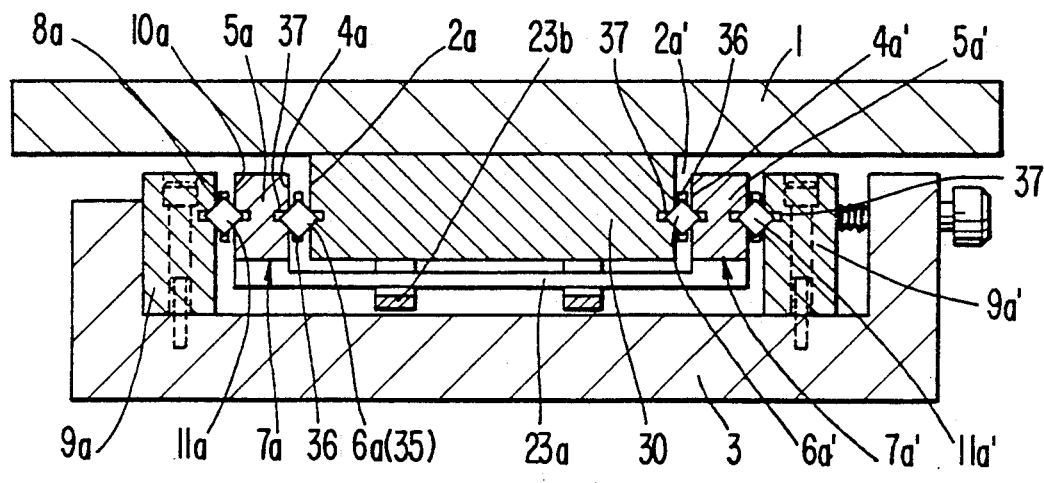
FIG. 1(b) is a sectional view along line 1b—1b of FIG. 1(a) and showing the table.

A first embodiment of the present invention, as shown in FIGS. 1(a) and 1(b), comprises two mutually orthogonal pairs of parallel guide faces 2a, 2a' and 2b, 2b' provided at conventional locations on a base 30 of a table 1, two pairs of wedge shaped guide members 5a, 5a' and 5b, 5b' having two mutually orthogonal pairs of parallel guide faces 4a, 4a' and 4b, 4b' movably mounted on a support base 3, and opposed to corresponding ones of said guide faces 2a, 2a' and 2b, 2b', respectively. The table base 30 is movably supported on said wedge shaped guide members 5a, 5a' and 5b, 5b' for movement in the direction of the length and width of the table, through two pairs of parallel straight motion guide bearing mechanisms 6a, 6a' and 6b, 6b' provided between the respective guide faces 2a, 2a' and 2b, 2b' and 4a, 4a' and 4b, 4b'; and drive mechanisms 12a and 12b are provided to move said table base 30, and hence the table 1, along one pair of said guide bearing mechanisms 6a, 6a' or 6b, 6b' by acting on the table base 30 through the guide member 5a or 5b and the other pair of said bearing mechanisms 6a, 6a' or 6b, 6b' on the respective pairs of said guide support members 5a, 5a' and 5b, 5b'. Straight motion guide bearing mechanisms 6a and 6a' are connected by connecting members 23a beneath table base 30, and bearing mechanisms 6b and 6b' are connected by connecting members 23 beneath table base 30.

Fixed guide support members 9a, 9a' and 9b, 9b' having guide faces 8a, 8a' and 8b, 8b' which are at an angle to the opposite guide faces 2a, 2a' and 2b, 2b' of the table base 30 are provided on the support base 3, and the wedge shaped guide members 5a, 5a' and 5b, 5b' respectively have guide faces 10a, 10a' and 10b, 10b' parallel to the corresponding guide faces 8a, 8a' and 8b, 8b', and are movable along the guide faces 8a, 8a' and 8b, 8b' of the fixed guide members 9a, 9a' and 9b, 9b' between the corresponding guide faces 2a, 2a' and 2b, 2b' on said table base 30 and guide faces 8a, 8a' and 8b, 8b' on the second guide members 9. Straight motion guide bearing mechanisms 11a, 11a' and 11b, 11b' are provided between the respective guide faces 8a, 8a' and 10a, 10a' and between guide faces 8b, 8b' and 10b, 10b' for movably supporting the guide members 5a, 5a' and 5b, 5b' on the fixed guide members 9a, 9a' and 9b, 9b'. Drive mechanisms 12a and 12b for said wedge shaped guide members 5a and 5b are provided on the support base and are comprised of motors 21a and 21b and screws 22a and 22b. It is clear that the wedge shaped guide members 5a' and 5b' could also be driven by similar drive means.

Figure 3A:
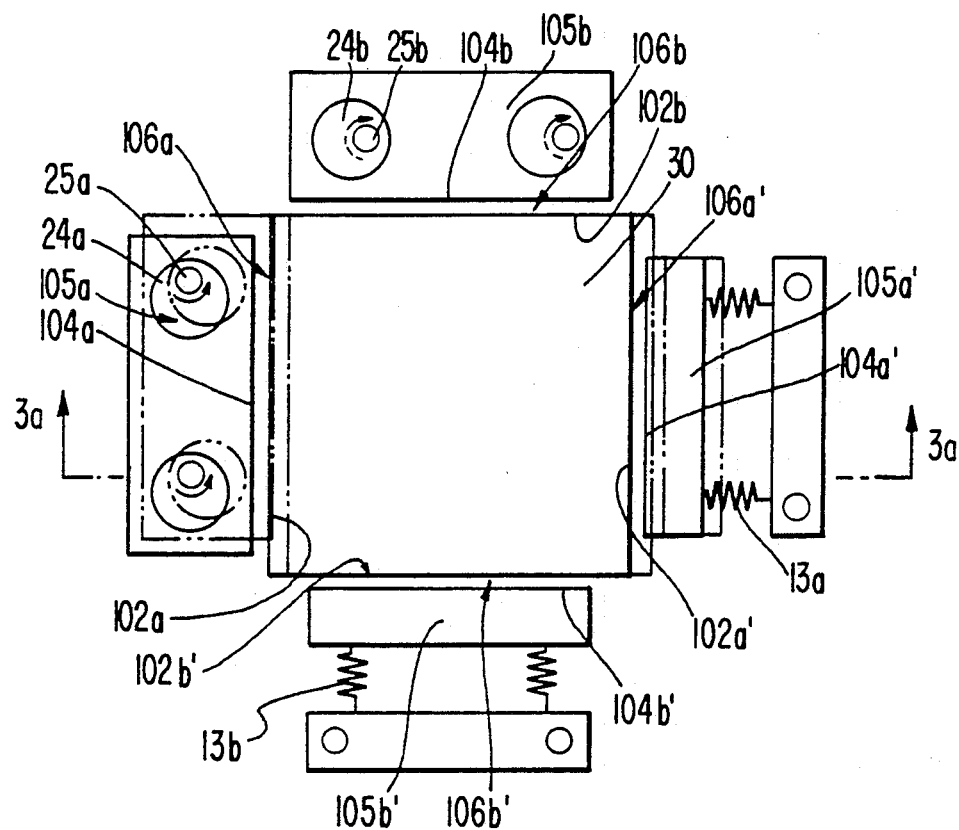
FIG. 3(a) is a plan view of another embodiment of the mechanism according to the invention with the table removed.
Figure 3B:
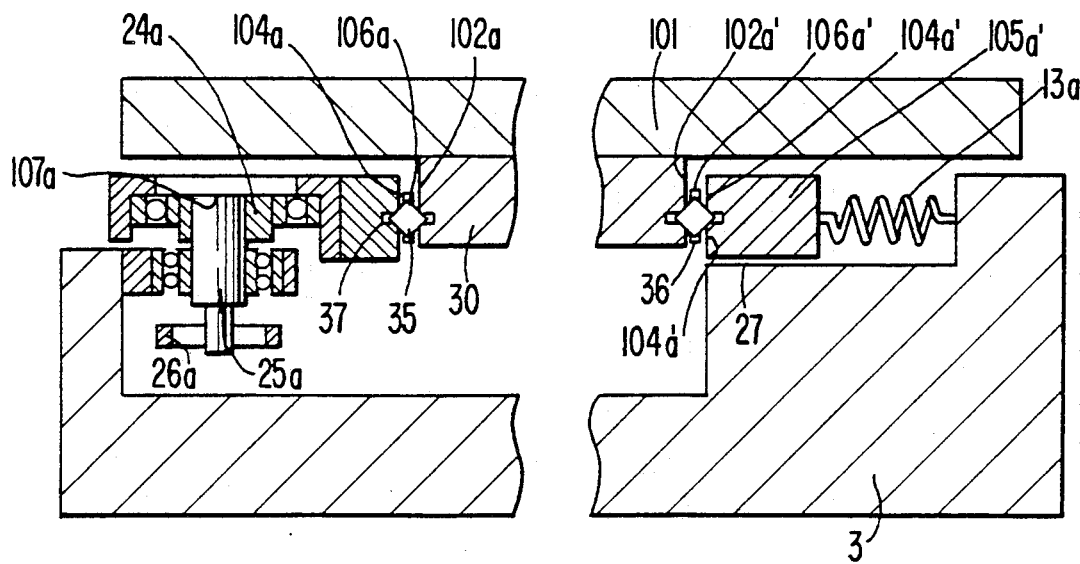
FIG. 3(b) is a sectional view on line 3a—3a of FIG. 3(a) and showing the table.

A modified embodiment of the present invention as shown in FIGS. 3(a) and 3(b) has rectangular guide members 105a and 105b movably supported on the support base 3 on eccentric cam mechanisms 24a, 25a and 24b, 26b which constitute drive mechanisms. Guide members 105a' and 105b' are mounted on springs 13a and 13b on the support base 3 for movement toward and away from the opposed guide members 105a and 105b. Guide faces and guide bearing mechanisms like those in the embodiment of FIGS. 1(a) and 1(b) are provided, and are given reference numbers different by 100 from the reference numbers of corresponding parts in FIGS. 1(a) and 1(b).

Instead of mounting guide members 105a' and 105b' on springs, they could be provided with a drive mechanism like the guide members 105a and 105b.

Figure 4A:
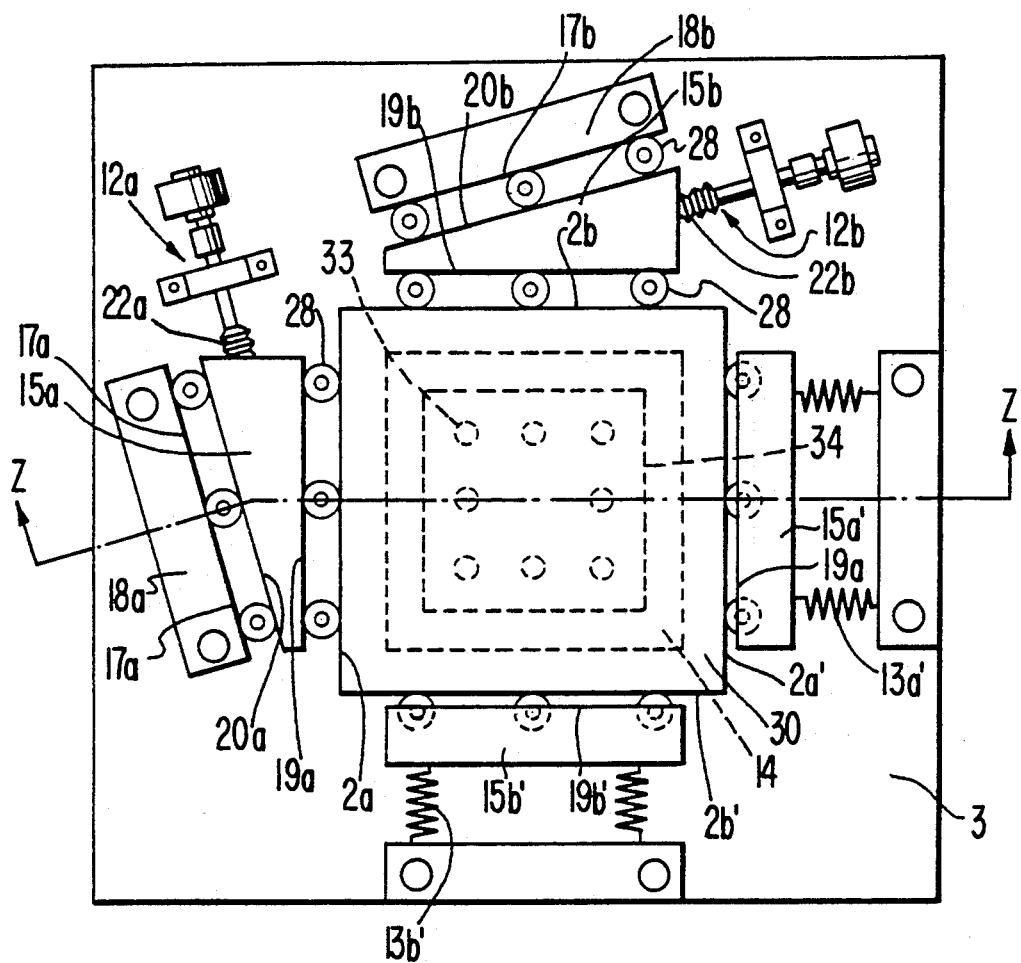
FIG. 4(a) is a plan view showing a further embodiment of the mechanism according to the invention, with the table removed.
Figure 4B:
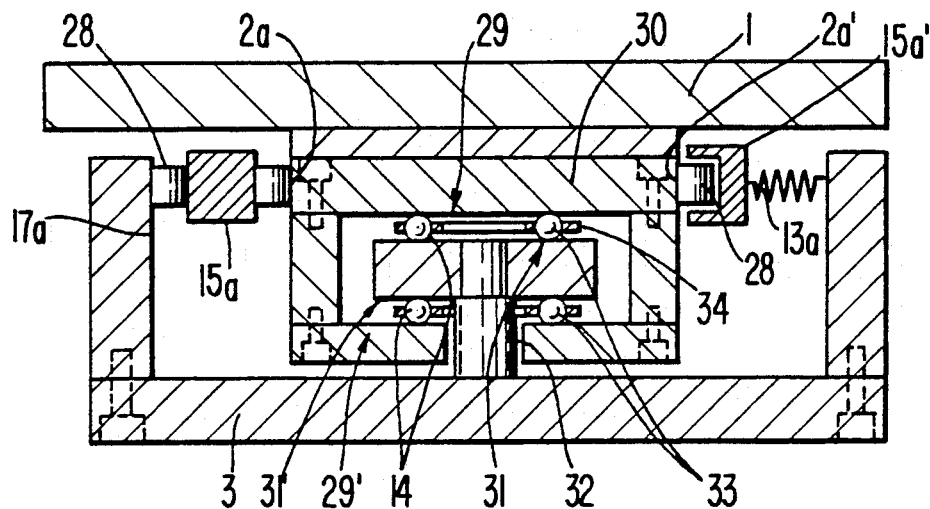
FIG. 4(b) is a sectional view on line 4b—4b of FIG. 4(a) and showing the table.

The third embodiment of the present invention as shown in FIGS. 4(a) and 4(b) comprises a table means constituted by a table 1 and a base 30 thereon, and is lengthwise and crosswise movably supported on a support base 3 on support bearing means constituted by ball bearings 33 between spaced bearing faces 29 and 29' in a hollow interior of the table base 30, and bearing faces 31 and 31' on a flange on a post 32 on support base 3 and extending into the hollow interior. Two mutually orthogonal pairs of parallel guide faces 2a, 2a' and 2b, 2b' are provided on respectively opposite sides of the table base 30, and wedge shaped guide members 15a and 15b are movably mounted on the support base 3 and have faces 19a and 19b opposed to and parallel with the respective guide faces 2a and 2b. Rollers 28 constituting a guide bearing means are provided between guide faces 2a and 19a and 2b and 19b. Channel shaped guide members 15a' and 15b' are provided in positions opposed to and parallel to faces 2a' and 2b' and further rollers 28 in the channels support faces 2a' and 2b'. Drive mechanisms 12a and 12b are provided to move said guide members 15a and 15b in the direction parallel to the corresponding guide faces on the table base 30 to move the base 30 and the table in one of the two orthogonal directions.

Fixed guide members 18a and 18b are mounted on support base 3 behind wedge shaped guide members 15a and 15b and have guide faces 17a and 17b inclined to the guide faces 2a and 2b of the table base 30. Wedge shaped guide members 15a and 15b have guide faces 20a and 20b opposed to and parallel to the respective guide faces 17a and 17b. Further rollers 28 are engaged between guide faces 17a and 20a and 17b and 20b, respectively. Guide members 15a' and 15b' are mounted on springs 13a' and 13b'.

Figure 5:
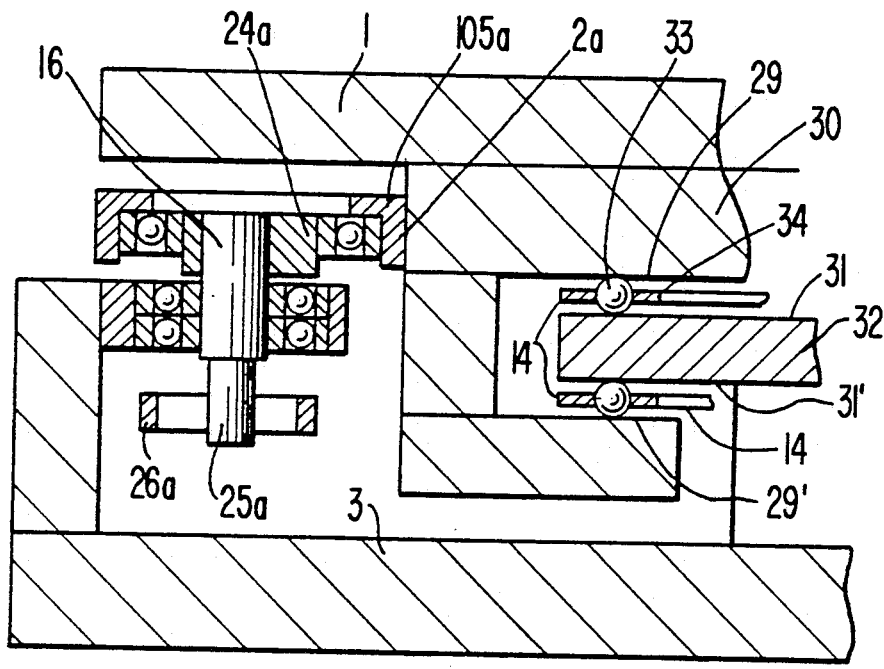
FIG. 5 is a sectional view of an important portion of a still further embodiment of the mechanism according to the invention.

It will be understood that in the embodiment of FIGS. 4(a) and 4(b), the wedge shaped guide members 15a and 15b can be replaced by rectangular members like members 105a and 105b, and the drive mechanism therefor can be eccentric cam mechanisms like the cam mechanisms 24a, 24b of FIGS. 3(a) and 3(b), as shown at 25a, 26a in FIG. 5.

Moreover, it will be understood that appropriate guide mechanisms can be provided for all the guide members 15a, 15a' and 15b, 15b'.

The operations of the present invention is described below.

Figure 2A:
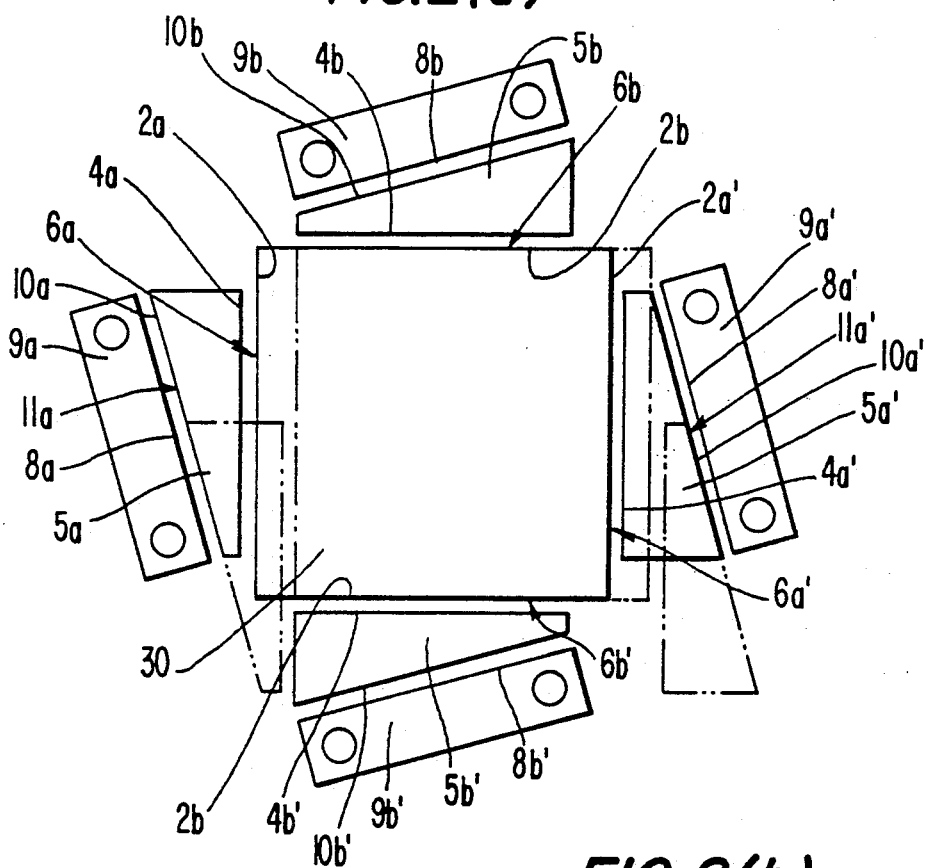
FIGS. 2(a) and 2(b) are schematic plan views for showing the operation of the mechanism of FIGS. 1(a) and 1(b)

In the embodiment shown in FIGS. 1(a) and 1(b), one motor 21a is driven to turn the screw 22a, and the wedge shaped guide member 5a is moved downward in the drawing by an internal thread portion (not shown) engaged with the screw 22a along the guide face 8a of the fixed guide member 91. In this case, the guide faces 4a and 4a' are moved rightward as well as downward together with both the wedge shaped guide members 5a and 5a' by the members 23a, as shown by chain lines in FIG. 2(a), while the guide face 4a presses guide face 2a and moves the table base 30, and thus table 1, rightward in the drawings (to the chain line position) along the guide faces 4b and 4b' on the straight motion guide bearing mechanisms 6b and 6b' engaged with the wedge guide members 5b and 5b' located at the top and bottom in the drawings. As stated above, since the guide face 4a' is interlocked with the guide face 4a, its movement does not disturb the movement of the table 1.

Contrariwise, if the screw 22a is turned reversely, to move the wedge shaped guide member 5a upward in the drawings, an action which is the reverse of the above description occurs. That is, the guide face 4a' presses on base 30 and moves the table leftward.

Figure 2B:
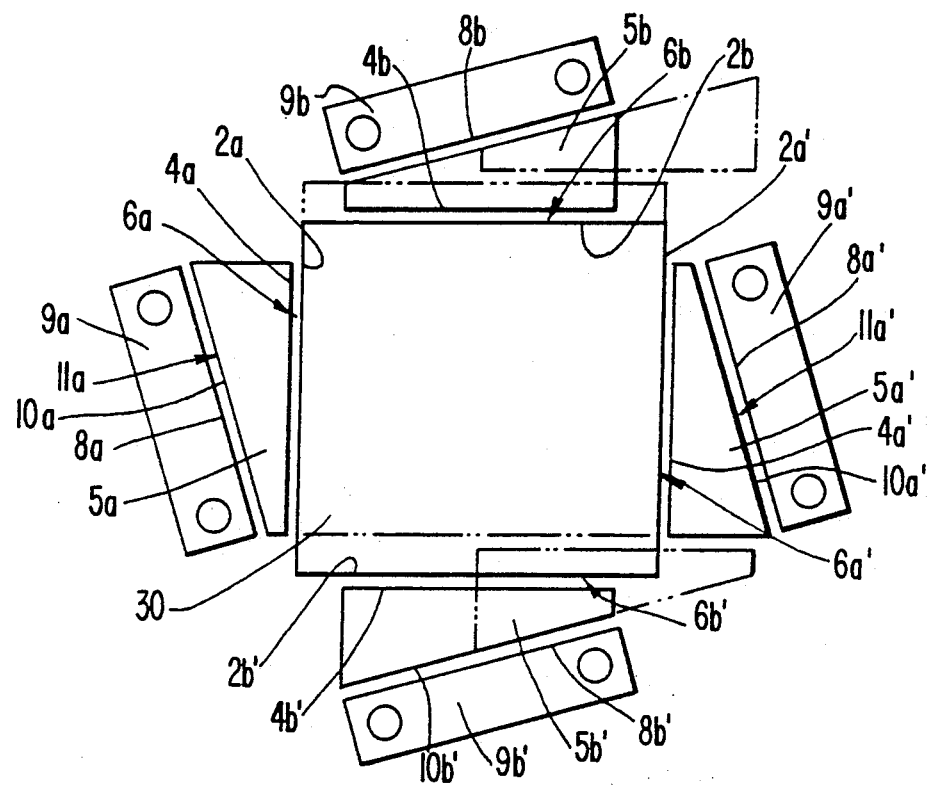

If the other motor 21b is driven to turn the corresponding screw 22b, the wedge shaped guide member 5b at the top in the drawings is moved rightward in the drawings along the guide face 8b of the fixed support member 9b, and the guide faces 4b and 4b' of the wedge shaped guide members 5b and 5b' are moved by the corresponding connecting members 23b upward together at the top and bottom in the drawings as shown by chain lines in FIG. 2(b). As a result, the table base 30, and hence the table 1, is moved upward in the drawings to the chain line position along the guide faces 4a and 4a' on the straight motion guide bearing mechanisms 6a and 6a' engaged with the wedge shaped guide members 5a and 5a' on the sides of the base 30.

Contrariwise, if the screw 22b is turned reversely, to move the wedge shaped guide member 5b leftward in the drawings, an action which is the reverse of the above description, moves the table 1 downward in the drawings.

In this way, in the present invention, either pair of the wedge shaped guide members, those on both sides or those at the top and bottom in the drawings, can be moved by the driving means 12 along the guide faces 8 of the fixed guide members 9, to drive the table base 30, and hence table 1, along the straight motion guide bearing mechanisms, for moving it in the direction of the straight motion guide bearing mechanisms engaged with the other pair of wedge shaped guide members. In this case, the respective pairs of the straight motion guide bearing mechanisms, which are also supporting the base 30 and table 1 on the guide members 5a, 5a' and 5b, 5b', do not interfere with each other. Thus, by the apparatus of the present invention, table 1 can be moved lengthwise or crosswise by driving either pair of the wedge shaped guide members, and furthermore, both the pairs can be simultaneously driven, to move table 1 in any desired direction to any desired position.

In the structure of FIGS. 3(a) and 3(b), if shafts 25a of eccentric cams 24a on the left in FIG. 3(a) are rotated counterclockwise as shown by the solid arrows in the drawing by belts 26a, etc. connected with a motor (not shown), the guide face 4a of the left guide member 5a is moved rightward, and as a result, the table base 30, and hence the table 1, is moved rightward in the drawings along the guide faces 4b and 4b' on the straight motion guide bearing mechanisms 6b and 6b' engaged with the guide members 5b and 5b' at the top and bottom, as shown by chain lines in FIG. 3(a). In this case, the right support member 5a' is moved along a bearing surface 27 of the support base 3 against the force of the springs 13a.

Contrariwise, if the shafts 25a of the eccentric cams 24a on the left in the drawing are turned clockwise, the guide face 4a of the left guide member 5a is moved leftward, and as a result the table base 30, and hence the table 1, is pressed by the force of the springs 13a through the right guide member 5a', to be moved leftward along the guide faces of 4b and 4b' on the straight motion guide bearing mechanisms 6b and 6b' on the guide members 5b and 5b' at the top and bottom in the drawing.

If the shafts 25b of eccentric cams 24b at the top in the drawing are turned counterclockwise, the guide faces 4b of the guide member 5b at the top in the drawing is moved downward in the drawing, and as a result, the table base 30 is moved downward in the drawing along the guide faces 4a and 4a' on the straight motion guide bearing mechanisms 6a and 6a' engaged with the guide members 5a and 5a' on both sides. In this case, the guide member 5b' at the bottom in the drawing is moved along the bearing surface (not shown) on the support base 3, against the force of the springs 13b. If the shafts 25b of the eccentric cams 24b at the top in the drawing are turned clockwise as shown by broken line arrows in the drawing, the guide face 4b of the guide member 5b at the top of the drawing is moved upward in the drawing, and as a result, the table base 30 is pressed by the force of the springs 13b through the guide member 5b' at the bottom in the drawing, to be moved upward in the drawing along the guide faces 4a and 4a' on the straight motion guide bearing mechanisms 6a and 6a' engaged with the guide members 5a and 5a' on both sides.

As described above, in the present invention, if either of the guide members 5 on both sides and either of the guide members 5 at the top and bottom in the drawing are driven by eccentric cam mechanisms, while the other two guide members 5 are pressed toward the guide faces on the table base by the force of the springs, then the table base 30, and hence table 1, can be moved toward the guide faces by the straight motion guide bearing mechanisms engaged with the other pair of guide members without mutual interference. Therefore, if either pair of guide members are driven, the table 1 can be moved in the desired direction lengthwise or crosswise, and if both the pairs of the guide members are driven, the table can be moved in any desired direction to a desired position.

As described above, in the embodiment shown in FIGS. 1(a) and 1(b), the drive mechanisms 12a and 12b are provided as the moving means for moving the wedge shaped guide members 5a and 5b, respectively. However, the drive mechanisms can be composed, for instance, of the eccentric cams 24 as shown in the example of FIGS. 3(a) and 3(b). Furthermore, in the embodiment of FIGS. 1(a) and 1(b), both the guide members 5a, 5a' and 5b, 5b' in the respective pairs, are connected by the connecting member 23a and 23b for interlocked motion, while guide members 5a and 5b in the respective pairs are provided with the driving means 12a and 12b using the screws 22a and 22b, to move the guide members 5a, 5a' and 5b, 5b' of the respective pairs through the connecting members 23a and 23b. However, the driving means 12a and 12b can be provided for both the guide members 5a, 5a' and 5b, 5b' of the respective pairs, for interlocked motion. Furthermore, the driving means 12a and 12b can also be hydraulic or pneumatic cylinders or any other means than those described above.

Moreover, in the embodiment of FIGS. 3(a) and 3(b), the guide members 5a and 5b in the respective pairs are provided with the drive mechanisms 12a and 12b, and the other guide members 5a' and 5b' are pressed toward the guide faces 2a' and 2b' of the table base 30 by the springs 13a and 13b, and the drive mechanisms 12a and 12b are eccentric cam mechanisms. However, the structure can be comprised of wedge shaped guide members and their driving means as in FIGS. 1(a) and 1(b), or any other appropriate mechanism than those described. The straight motion bearing mechanism can be ball bearings, roller bearings, plain bearings or any other appropriate bearing means, so long as they allow the movement of the table base 30 along the guide faces and support the load of the table 1. For instance, in the embodiments shown in FIGS. 1(a) and 1(b) and 3(a) and 3(b), the straight motion guide bearing mechanisms are constituted by rollers 35 having the axes of alternate rollers at 90° each and held by holding members 36, and engaged in guide grooves 37, i.e. so-called cross roller way mechanisms.

The above embodiments of FIGS. 1(a) and 1(b) and 3(a) and 3(b) of the present invention support the table base 30 by the guide members through the straight motion guide bearing mechanisms so as to be movable lengthwise and crosswise on the support base 3. The embodiments of FIGS. 4(a) and 4(b) and FIG. 5 of the present invention has the table base 30 supported on the support base 3 on bearing means 14 for lengthwise and crosswise movement. In this structure, the guide members 15a, 15a', and 15b, 15b' abutting against the two mutually orthogonal pairs of parallel guide faces 2a, 2a', and 2b, 2b' to support the base 30 movably in the guide direction are provided on the support base 3, and the guide members 15a and 15b are driven like the guide members 5a and 5b in the FIG. 1(a) and 1(b) embodiment of the invention, by the drive mechanisms 12a and 12b, to drive the table 1 lengthwise or crosswise or in any desired direction. In the embodiment shown in FIGS. 4(a) and 4(b), respective guide members 15a and 15b in the pairs are wedge shaped and are moved by the drive means 12a and 12b using the screws 22a and 22b, and are moved between the guide faces 2a and 2b of the table base 30 and the guide faces 17a and 17b of the fixed guide members 18a and 18b inclined to the guide faces 2a and 2b. In this structure, the table 1 can be moved in the same motion as with the wedge shaped guide members in the previously described embodiments. The other guide members 15a' and 15b' are moved by the force of the springs 13a' and 13b'. In the structure shown in FIG. 5, the guide member 15a moves the table base 30 by an eccentric cam mechanism. The action of the mechanism is also the same as the action of the guide members 5 in the previoiusly described embodiments. However, in this embodiment, since the load of the table 1 is receivd by the bearing means 14, the guide members 15a, 15a' and 15b, 15b' are only required to cause the lengthwise and crosswise movement of the table 1, and in the case of the structure in FIGS. 4(a) and 4(b), only rollers 28 held by an appropriate structure are provided between the guide faces 19a, 19a' and 19b, 19b' of the guide members and the guide faces 2a, 2a' and 2b, 2b' of the table base 30. As in the embodiments described previously, the guide members and the drive mechanisms can be any other appropriate means.

The bearing means 14 in this embodiment can be ball bearings, fluid bearings or any other appropriate bearings, so long as they can movably support the table 1 in lengthwise and crosswise movement. The rollers 28 or other bearing means need not be load bearing with respect to the load on the table. In the embodiments shown in FIGS. 4(a) and 4(b) and FIG. 5, the table base 30 has a hollow interior with a downward facing bearing face 29 and an upper facing bearing face 29', and a post 32 with a flange having an upward facing bearing face 31 and a downward facing bearing face 31' opposed to the bearing faces 29 and 29' is mounted on the support base 3. The ball bearings 33 held by a holding member 34 are provided between the respective corresponding bearing faces 29 and 31, and 29' and 31'. In this structure, vertical movement of the table 1 is prevented to achieve positive support.

In all the embodiments of the present invention, two mutually orthogonal pairs of parallel guide faces are provided on the table means. For instance, the table base 30 can protrude below the table 2 and on which the guide faces are provided, as shown in the drawings, or the end faces of the table itself can be used as the guide faces.

In the present invention, as described above, in one embodiment a table is supported on two pairs of straight motion bearing mechanisms on guide members on a support base with the guide directions of the bearing mechanisms orthogonal to each other, and drive mechanisms are provided to move the table through one of the pairs of guide members and said bearing mechanisms along the other pair of said bearing mechanisms on the pair of guide members. Therefore, even if the two pairs of guide members and straight motion guide bearing mechanisms are provided in the same plane, they do not interfere with each other, and it is not required to overlap the two pairs of guide members and straight motion guide bearing mechanisms. Therefore, the present invention can provide such advantages as that the height from the support base to the table can be decreased, that the table can be stably moved lengthwise and crosswise, that the space occupied by the table moving mechanism, the number of parts used, and the man hours for assembling can be decreased, and that the assembling accuracy can be easily obtained. In another embodiment of the present invention, the table is movably supported on bearing means on the support base for lengthwise and crosswise movement, and guide members are provided with guide surfaces corresponding to the two mutually orthogonal pairs of parallel guide faces on the table, to transmit the moving force through the guide members of the table. This embodiment provides such various advantages as that the height from the support base to the table can be decreased, that the table can be stably moved lengthwise and crosswise, that the space occupied by the table moving mechanism, the number of parts used, and the man hours for assembling can be decreased, and that the assembling accuracy can be easily achieved, as in the first embodiments.

What is claimed:

1. A mechanism for moving a table means horizontally in orthogonal directions, comprising:

two mutually orthogonal pairs of table carried parallel guide faces adapted to be mounted on the table means;

a support base;

two pairs of guide members each pair having two parallel guide faces in horizontally spaced opposed relation to corresponding table carried guide faces, the parallel guide faces on one pair of guide members being orthogonal to the parallel guide faces on the other pair of guide members, said guide members each being movably mounted on said support base for movement in a direction for moving parallel guide faces of the respective pairs of guide member guide faces in a horizontal direction perpendicular to the length of the guide member guide faces;

two pairs of parallel straight motion guide bearing mechanisms mounted between horizontally spaced opposed pairs of guide faces for movably supporting the table means on said guide members for movement along the parallel guide faces of said guide members and supporting the weight of the table means; and drive means engaged with at least one guide member of each pair of guide members for moving the one guide member in a direction to move the guide face thereof in said perpendicular direction.

2. A mechanism as claimed in claim 1 further comprising second guide members fixed on said base and each having a further guide face opposed to a corresponding table carried guide face and at an angle thereto, and said guide members are wedge shaped and each having a second guide face thereon in spaced opposed parallel relation to the corresponding further guide face on the corresponding second guide member, and said mechanism still further comprising further straight motion guide bearing mechanisms between the second guide faces of said guide members and the further guide faces on said second guide members for movably supporting said guide members on said second guide members, and said drive means comprises means engaged with at least two of said guide members on mutually orthogonal sides of the table means for moving said guide members along the further guide faces.

3. A mechanism as claimed in claim 2 in further comprising means extending beneath said table means for connecting the guide members on opposite sides of the table means to each other for movement together.

4. A mechanism as claimed in claim 1 in which said drive means comprises eccentric cam means operatively engaged with at least one guide member in each pair for moving said guide member in said perpendicular direction.

5. A mechanism as claimed in any one of claims 1-3 in which said drive means in engaged with both guide members of each pair for driving said guide members together as a unit.

6. A mechanism as claimed in any one of claims 1-3 further comprising spring means engaged with the other guide member in each pair for urging said other guide member toward the one guide member in each pair.

* * * * *